United States Patent
Shotey et al.

(10) Patent No.: US 6,956,169 B1
(45) Date of Patent: Oct. 18, 2005

(54) FLUSH-MOUNT IN-USE COVER FOR ELECTRICAL OUTLET

(75) Inventors: Michael Shotey, Scottsdale, AZ (US); Marcus Shotey, Scottsdale, AZ (US); Edgar Maltby, Mesa, AZ (US); John Kinnard, Queen Creek, AZ (US)

(73) Assignee: Taymac Corporation, Gilbert, AZ (US)

( * ) Notice: Subject to any disclaimer, the term of this patent is extended or adjusted under 35 U.S.C. 154(b) by 0 days.

(21) Appl. No.: 10/803,604

(22) Filed: Mar. 17, 2004

(51) Int. Cl.$^7$ .............................................. H01R 13/46
(52) U.S. Cl. ........................... 174/58; 174/67; 174/66; 174/50; 174/53; 174/49; 174/48; 174/55; 220/3.2; 220/3.8; 220/241; 220/242; 220/230
(58) Field of Search ............................. 174/58, 67, 66, 174/50, 53, 49, 48, 55; 220/3.2, 3.8, 241, 220/242, 230

(56) References Cited

U.S. PATENT DOCUMENTS

| | | | |
|---|---|---|---|
| 2,757,817 A | 8/1956 | Egan | |
| 3,987,928 A | * 10/1976 | Mori | ........................ 220/241 |
| 4,988,832 A | 1/1991 | Shotey | |
| 5,171,939 A | 12/1992 | Shotey | |
| 5,317,108 A | 5/1994 | Prairie, Jr. | |
| 5,389,740 A | 2/1995 | Austin | |
| 5,449,860 A | * 9/1995 | Buckshaw et al. | ............ 174/67 |
| 5,456,373 A | * 10/1995 | Ford | ........................... 220/242 |
| 5,574,256 A | 11/1996 | Cottone | |
| 5,763,831 A | 6/1998 | Shotey et al. | |
| 5,866,845 A | 2/1999 | Markiewicz et al. | |
| 6,476,634 B1 | 11/2002 | Bilski | |
| 6,583,358 B1 | 6/2003 | Shotey et al. | |
| 6,642,453 B2 | 11/2003 | Shotey et al. | |
| 2003/0024725 A1 | 2/2003 | Lalancette et al. | |
| 2003/0089710 A1 | 5/2003 | Gates, II | |

* cited by examiner

Primary Examiner—Anthony Dinkins
Assistant Examiner—Anton Harris
(74) Attorney, Agent, or Firm—Booth Udall, PLC

(57) ABSTRACT

A simplified installation design for an in-use cover for an electrical outlet includes conical mounting screw holes in the outlet box and movement-restricting guides to ensure the mounting screw aligns with the mounting screw holes. Angled side mounting screw holes allow the outlet box to be installed with screws from within the box rather than the conventional nails outside the box. In particular embodiments of the invention, prongs, screws, clamps, heat stakes or other attachment components extend from the back of the insert to allow for pre-installment attachment of the electrical device directly to the insert. This also simplifies installation of the recessed in-use covers. Adaptors may optionally be included to allow the device to be adapted for use with a variety of sizes and shapes of electrical devices. An alternate embodiment of the invention includes a recessed in-use outlet formed of an electrical box, a receptacle, a cover plate and a cover to allow for simple installation with fewer parts. Various embodiments may be installed in new construction or after wall coverings have been installed.

23 Claims, 18 Drawing Sheets

FLUSH-MOUNT IN-USE COVER FOR ELECTRICAL OUTLET

BACKGROUND OF THE INVENTION

1. Technical Field

This invention generally relates to an in-use cover for an electrical outlet, and more particularly to an in-use cover for a recessed electrical outlet having a cover mounted flush with the wall. Particular aspects of the invention relate to other electrical boxes as well.

2. State of the Art

In-use covers for electrical outlets refer to outlet covers that can remain closed while a cord is plugged into the outlet while the cover is closed. In-use covers conventionally fall into at least two categories: Bubble covers and flush mount covers. Bubble covers are generally used where the sockets for the outlet are mounted near the outer surface of the wall. The outlet is covered by an in-use cover by providing a cover that creates a bubble around the cords plugged into the outlet. Examples of bubble covers include those shown in FIGS. 1 and 2 of U.S. Pat. No. 5,763,831 to Shotey et al. (filed May 25, 1995), and that shown in FIGS. 13–16 of U.S. Pat. No. 6,476,321 to Shotey et al. (filed Nov. 1, 2001). Flush mount covers are generally used where the sockets for the outlet are mounted recessed into the wall with the cover closing against the wall. The outlet is covered by an in-use cover by the spacing between the cover and the sockets allowing for a plug to be plugged into the socket while the cover is closed. Examples of flush-mount in-use covers include those shown in U.S. Pat. No. 4,988,832 to Shotey (filed Oct. 31, 1988) and 5,171,939 to Shotey (filed Oct. 12, 1990).

One difficulty experienced with flush-mount in-use covers relates to the fact that the outlet is mounted back inside the outlet box. As such, at least some of the work that is done by the installer is done without a clear view of the work being done. This can result in some difficulty. Conventionally, in-use covers are installed by attaching the outlet to an insert for the recessed box, placing the insert into the recessed outlet box, aligning the screws of the insert with the box mounting screw holes, and tightening the insert screws to the box mounting screw holes. Because aligning the screws of the insert with the box mounting screw holes is done without a clear view of the box mounting screw holes, and because the insert generally can axially rotate to some degree, accurate placement of the insert screws into the box mounting screw holes is often difficult and can frustrate installers.

Additionally, early designs of flush-mount in-use covers connected the sockets to the insert by screws prior to placing the insert into the recessed box so that the sockets would have a solid connection to the system to support pressure from a person plugging in a cord to the outlet. Attaching the sockets to the insert rather than directly installing the socket into the recessed box was to simplify installation and make more of the installation visible to the installer when the installation was being performed.

DISCLOSURE OF THE INVENTION

The present invention relates to a flush-mount in-use cover with a simplified alignment feature for aligning the mounting screws on the insert with the box mounting screw holes on the recessed box. Movement-restricting guides are mounted on both the inner surface of the recessed box and the outer surface of the insert to assist in alignment of the mounting screws and the mounting screw holes. Additionally, enlarged conical openings are formed on the box mounting screw holes of the recessed box to make it easier to position the mounting screws into the mounting screw holes. The movement-restricting guides restrict rotational movement of the insert to a region where an edge of the conical mounting screw hole will be within the range of lateral movement so that the mounting screw, extending perpendicularly from the back of the insert, will fall within an outer edge of the cone and tend to be aligned with the mounting screw hole. While the conical opening alone will likely provide an advantage to conventional screw hole openings, the combination of the conical mounting screw hole opening and the movement-restricting guides significantly simplifies the installation process.

Another aspect of the present invention is a pre-install socket feature to quickly couple the socket to the back surface of the insert. In this way, the mounting screws may be aligned with the mounting screw holes of the base using at least a partial view of the mounting screw holes to simplify the installation process. In addition to coupling the socket to the back of the insert using prongs, screws, heat stakes or clamps, additional inserts for varying outlet and cover sizes and shapes may be conveniently coupled to the back of the insert portion of the flush-mount, in-use cover. Additionally, or alternatively, knock-out tabs may be included within the back surface of the insert to allow for varied outlet and cover sizes using the same product. A hinged cover mounts to the insert.

The recessed outlet box may be mounted to a wall by screw-mounting the outlet box to a wall stud through angled screw-mounts on the side of the box. Alternatively, if so configured, particular embodiments of the invention may be nail-mounted to a wall stud, or provided with rotatable flaps that clamp the outlet box to the wallboard directly.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
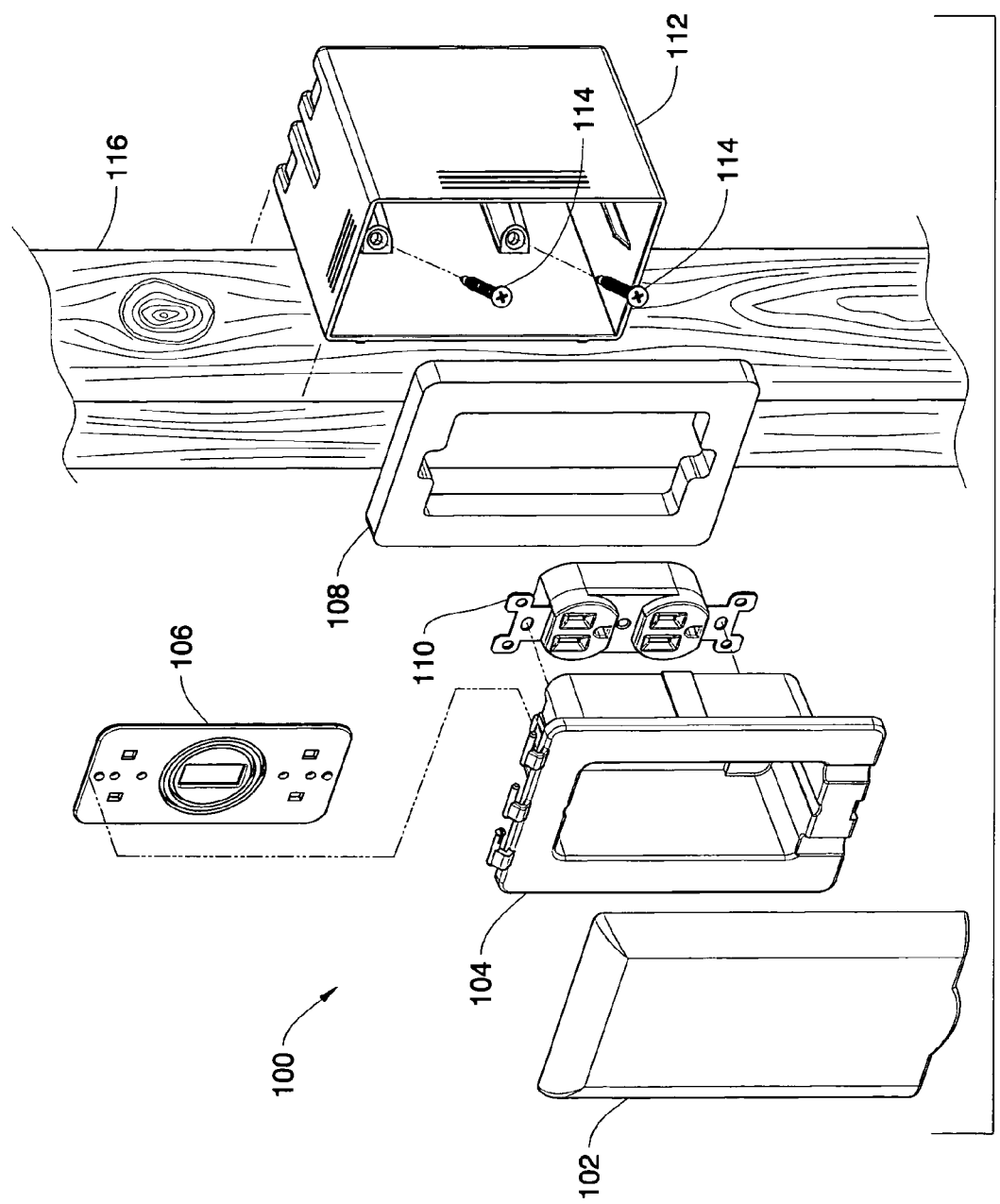
FIG. 1 is a perspective view of a recessed outlet and cover configured according to an embodiment of the present invention.
Figure 2:
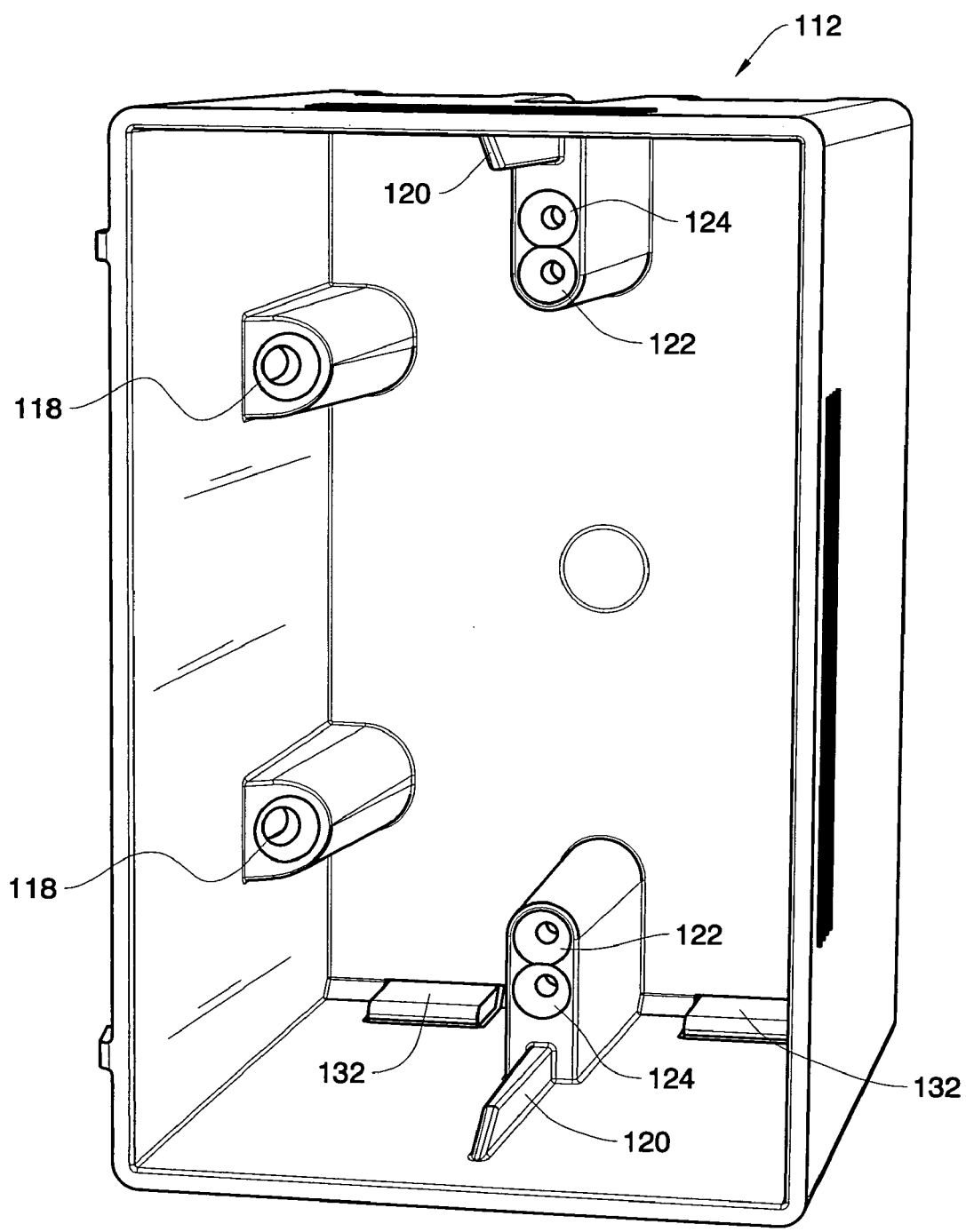
FIG. 2 is a front perspective view of an outlet box with angled screw holes and fins configured according to an embodiment of the present invention.
Figure 4A:
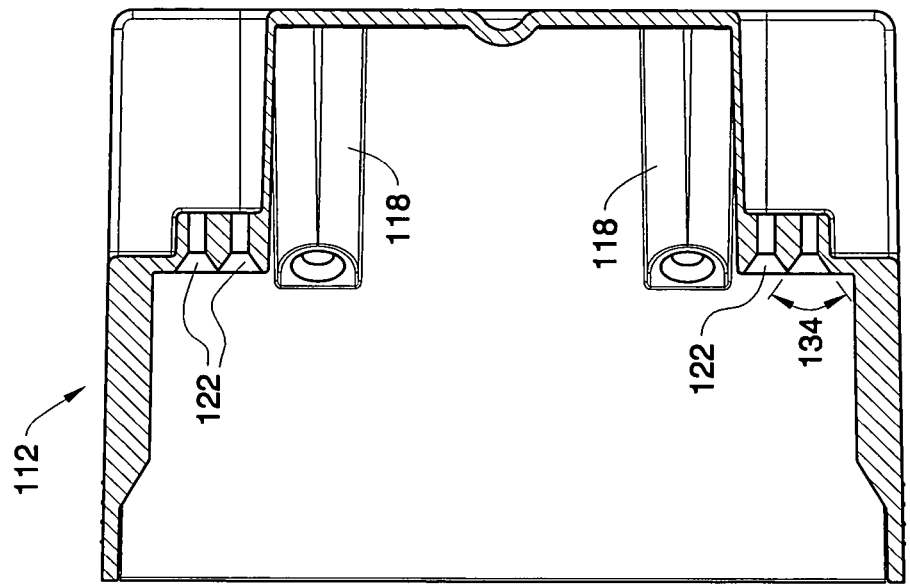
FIG. 4A is a cross-sectional view of the outlet box of FIG. 2 sectioned along section lines 4A—4A of FIG. 3.
Figure 14:
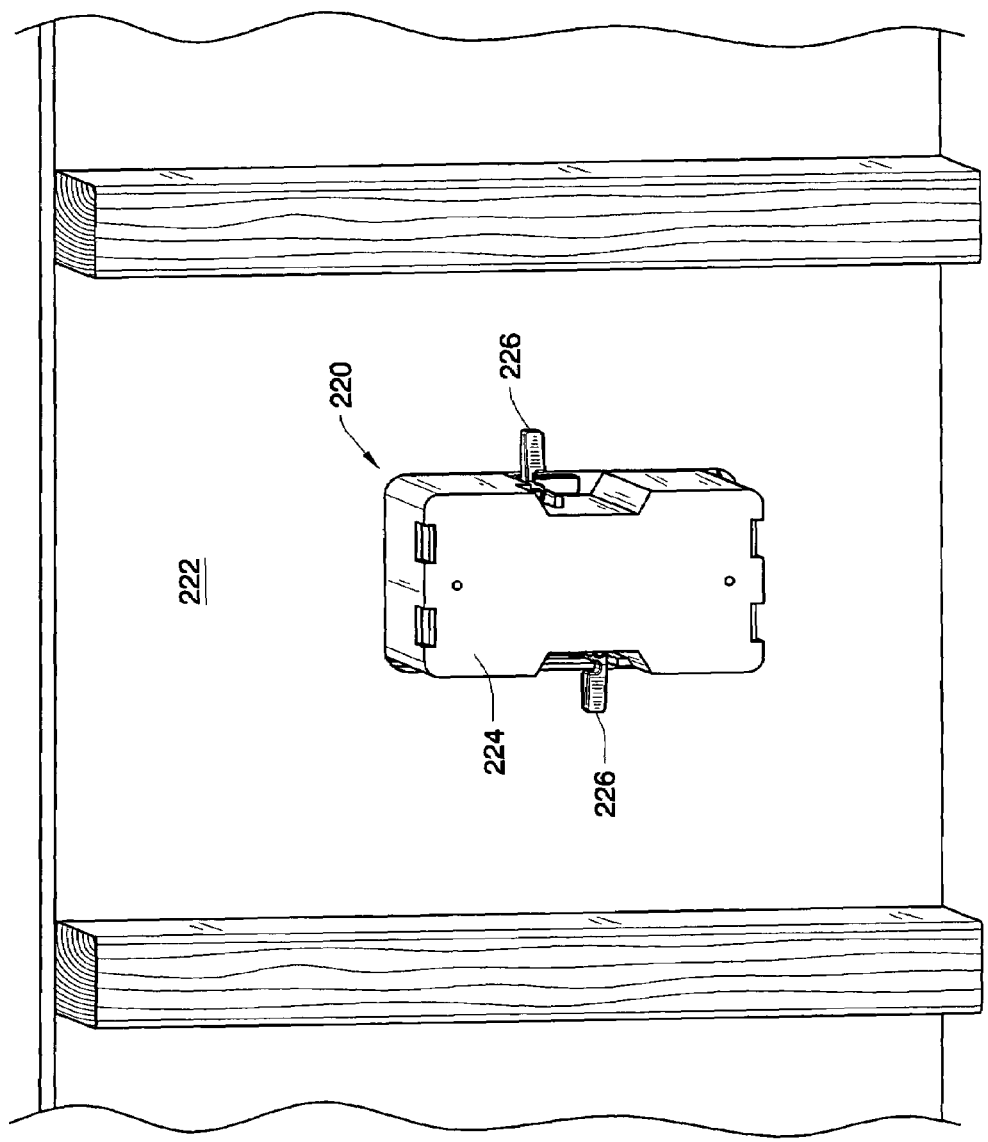
FIG. 14 is a rear view illustration of a recessed outlet box mounted to a wallboard by adjustable arm clamps.
Figure 15:
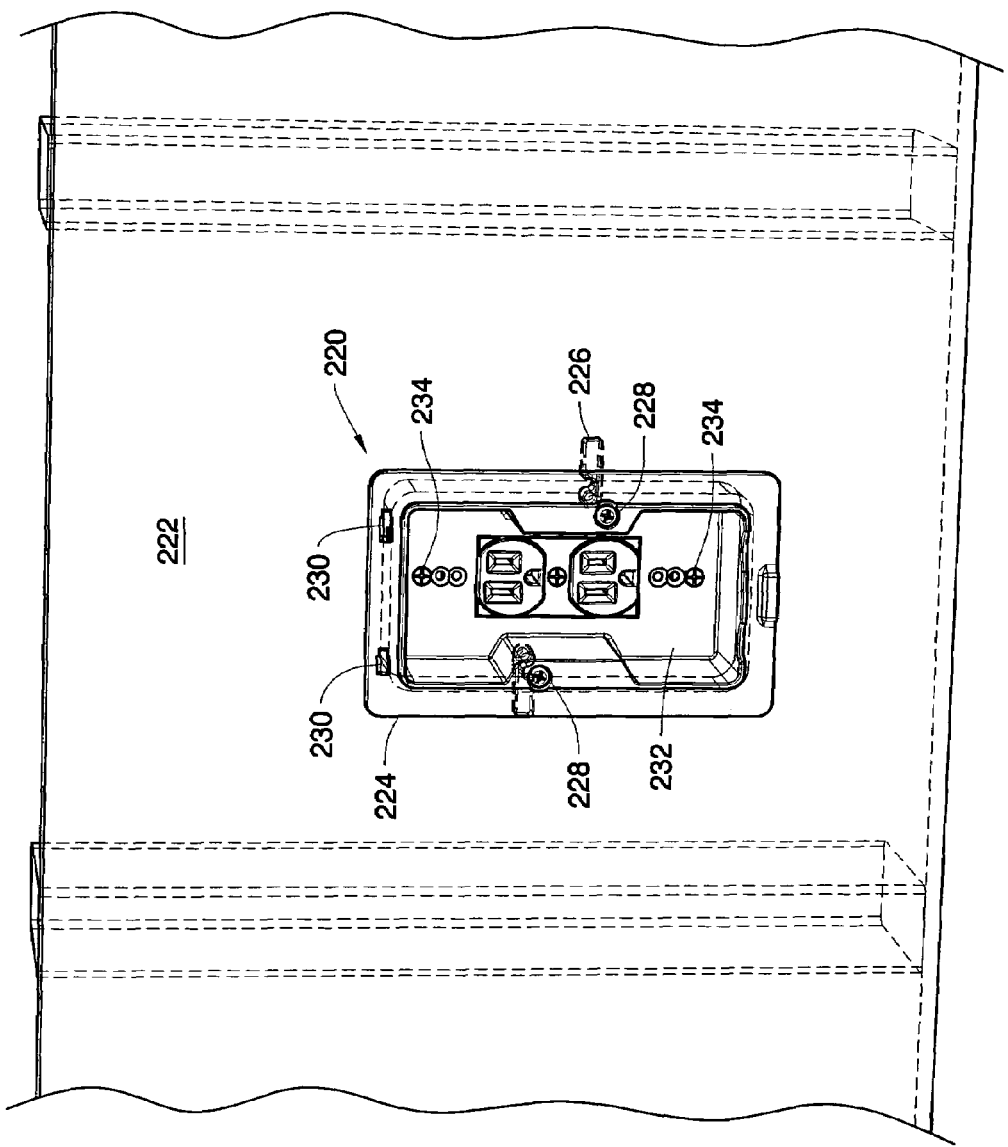
FIG. 15 is a front view illustration of a recessed outlet box mounted to a wallboard by adjustable arm clamps.

As discussed above, embodiments of the present invention relate to in-use flush-mount recessed outlets. Aspects of the invention are also applicable to other electrical boxes. As shown in FIG. 1, an in-use cover system 100 for an electrical outlet includes a hinged cover 102, an insert 104, optional converter or adapter plate attachments 106, an optional gasket 108, a receptacle 110, and an outlet box 112. The recessed outlet box 112 may be coupled to the framing support 116 through angled screws 114, or through other attachment structures, such as conventional nails (see FIGS. 12–13). Alternatively, as shown in FIGS. 14 and 15, an outlet box 112 may be coupled to the wallboard or wall material directly through rotating clamps.

As shown in FIGS. 2–5, the recessed outlet box 112 includes a number of features different from conventional recessed outlet boxes. Angled screw mounts 118 are included in a side of the outlet box 112. Conventionally, outlet boxes are provided with standard nail mounts or with rotating brackets. For situations where the outlet box needs to be installed after a wall covering has been placed on the wall, conventional the nail mounts on the top and bottom of the outlet box are useless and do not work. By placing an angled screw mount 118 within the opening the outlet box can be installed onto any wall regardless of whether the wall covering is in place. If a wall covering is already in place, the installer could cut an opening in the wall adjacent a framing structure for the outlet box 112, and attach the outlet box 112 to the framing structure using screws.

Figure 3:
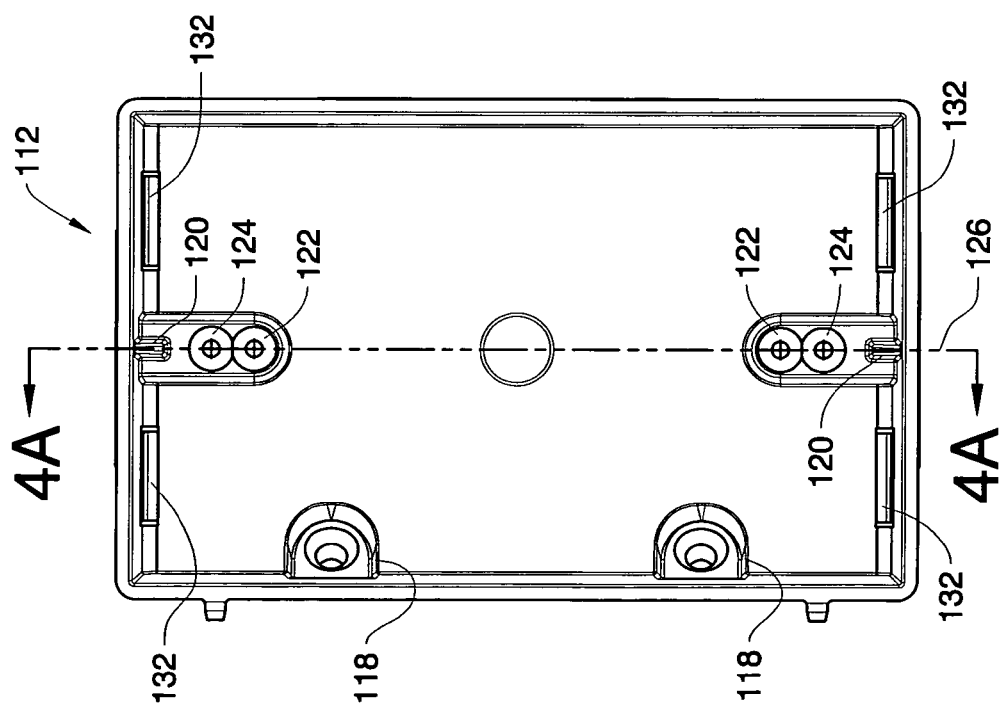
FIG. 3 is a front view of the outlet box of FIG. 2.

Guiding ridges 120 are included on both the top and bottom sides of the box 112. For this particular embodiment, the guiding ridges 120 are aligned with the conical mounting screw holes 122 and 124, which are located along the longitudinal axis 126 (FIG. 3) of the recessed outlet box 112. It is also contemplated that in particular embodiments of the present invention, one or more guiding ridges 120 may be placed at locations on the sides, top or bottom of the outlet box 112 and will provide the intended benefit so long as they align with corresponding structures on the insert. Covered openings 132 may also be provided as is conventional in recessed electrical outlet boxes for allowing entrance of conductive wires into the outlet box and for restricting the movement of the wires once received. FIG. 3 shows a front view of the recessed outlet box 112 of FIG. 2. FIG. 4 is a cross-sectional view of the recessed outlet box 112 of FIG. 3, taken along cross-section line 4—4.

Note the cross-section of the conical mounting screw holes 112 (FIG. 4). The angle 134 formed by opposing sides of the conical surface of the mounting screw holes 122 and 124 is relevant to how easily the mounting screw will tend to move toward the hole 122 and 124. If, for example, the angle is extended too broadly, a screw tip contacting the side wall of the cone will be stuck on the side and not slip toward the center. If, on the contrary, the angle 134 is created too narrowly, the hole is more difficult to find with the screw.

For any outlet box into which an electrical outlet will be mounted, the installer inserts the mounting screws through the yokes of the electrical outlet and into the mounting screw holes of the outlet box. In many cases, the installer does this by first extending the mounting screws (with their flat tips) through the yokes and then by coupling that combination to the outlet box. This involves the installer watching closely as the mounting screw tip fits into the mounting screw hole to ensure the tip actually penetrates the hole. Often times, particularly with the bottom mounting screw, it is difficult for the installer to see the hole and to direct the screw because the electrical outlet is in the way. This is particularly true of recessed outlet boxes, such as those shown in embodiments of the present invention, where an insert is used. This difficulty occurs because the insert is in the way of the installer's view of the outlet box. Thus, the installer is required to blindly install the mounting screws into the mounting screw openings by touch rather than by sight. This slows installation and can cause unneeded difficulty and frustration.

By including conical openings to the mounting screw holes for an outlet box as shown in FIGS. 2–5, the installer is given a much larger target to hit when inserting the mounting screw, significantly increasing the likelihood that the installer will hit the mounting screw hole and install the electrical outlet sooner. There are many screw openings that include a conical opening where a standard wood screw or other tapered head screw is being used to allow the screw head to recess into the screw opening. For an electrical outlet box mounting screw opening, however, the mounting screw head does not recess into the opening because the yoke of the outlet is between the screw head and the outlet box.

Figure 4B:
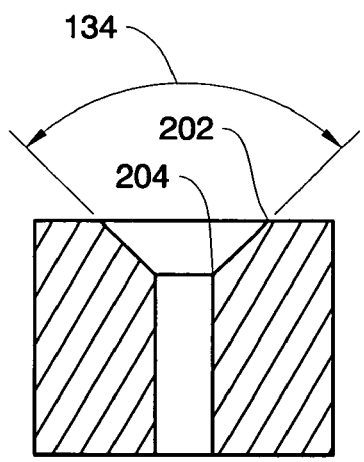
FIGS. 4B–4E are cross-sectional views of various possible configurations for conical screw openings configured for use with an embodiment of the present invention.
Figure 4E:
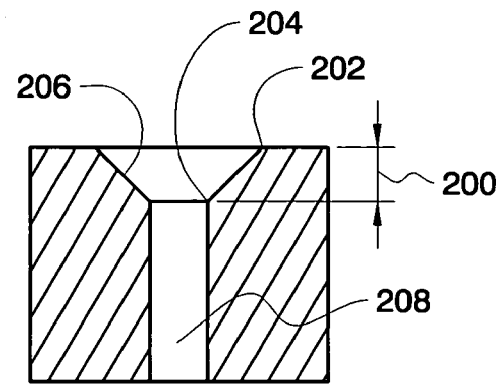
Figure 4F:
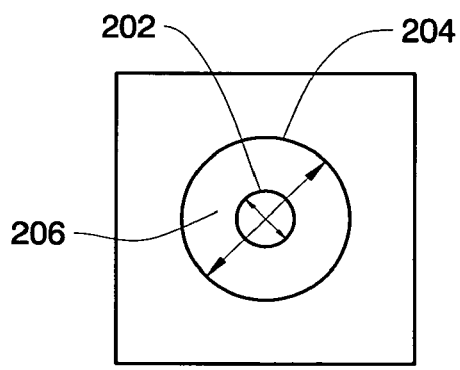
FIG. 4F is a top-down view of a conical screw opening of the configurations shown in FIGS. 4B–4E.
Figure 4C:
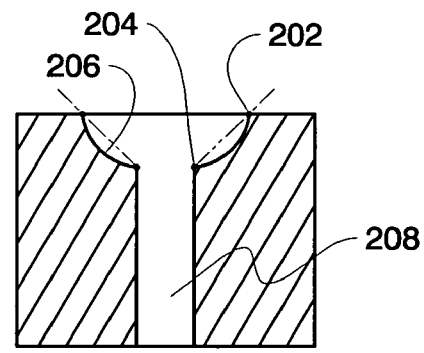

As shown in FIGS. 4B–4C, the physical characteristics of conical mounting screw holes can be varied resulting in an incredibly large number of combinations that will affect the ease with which the screw may be inserted. Many different variances in the characteristic combinations will be advantageous in many different outlet box and screw characteristics combinations and that they cannot all be discussed here. For clarity of explanation, the description will be made with respect to a recessed outlet box using a standard electrical duplex outlet and a conventional #6 screw, though it should be understood that using different sizes of screws, different outlet box types, and different box depths will necessarily result in different design choices for the conical shape characteristics of the mounting screw holes. It is believed that the principles described here are sufficient to enable those of ordinary skill in the art to configure an appropriate conical mounting screw hole opening for a variety of outlet box configurations.

FIGS. 4B, 4E and 4F illustrate various characteristics of a conical screw hole opening. The opening has a depth 200 (FIG. 4E) extending from a hole opening diameter 202 to a hole body diameter 204. As used herein, the "total opening angle" is the angle 134 extending between the hole opening diameter 202 and the hole body diameter 204. While the slope of the sides 206 of the conical screw hole opening of FIGS. 4B and 4E is fairly consistent, it can be seen from the examples provided in FIGS. 4C and 4D that this is not required and that the amount of slope may vary between the hole opening diameter 202 and the hole body diameter 204.

It should be understood that reducing the slope will increase the surface friction induced upon a screw entering the mounting screw opening. Conversely, increasing the slope will reduce the surface friction and allow the screw to move toward the hole body 208 more easily. Generally, for a particular design, the hole body diameter 204 has a fixed value determined by the diameter of the screw being used. For a #6 screw, this diameter is 0.136 inches. Because the hole body diameter 204 is fixed, if the hole opening diameter 202 is kept constant, increasing the slope requires the depth 200 of the hole opening to be increased. This, in turn, requires that a longer screw be used to ensure that adequate contact is made between the screw threads and the hole body 208 threads. This generally places a practical limit upon how steep of a slope can be used. If, on the other hand, the opening depth 200 is kept constant and the hole opening diameter 202 is adjusted to increase the slope, the slope may be increased only by reducing the hole opening diameter 202, thereby reducing the size of the target for which an installer is aiming. It is more desirable to have a large hole opening diameter 202 to provide a larger target for the installers to hit with the mounting screw. However, the hole opening diameter 202 is generally limited in its size by the physical structures within the outlet box.

Through testing on outlet box mounting screw hole openings using a #6 screw, it has been found that a hole opening diameter 202 approximately 1.5 to approximately 3.5 times the hole body diameter 204 works well for finding the target, and a hole opening depth 200 of approximately 0.5 to approximately 2 times the hole body diameter 204 works well for obtaining an adequate slope. Using a particular example of a hole body diameter 204 of 0.136 inches, for a #6 screw and a hole opening diameter 202 of 0.408 inches, a plurality of total opening angles 134 for the hole opening were tested (resulting in corresponding varied hole opening depths 200). It was determined that for this combination of hole opening diameter 202 and hole body diameter 204, and a total opening angle of approximately 20 degrees to approximately 135 degrees works adequately for allowing the screw to move toward the hole body diameter 204 smoothly. The total opening angle range from approximately 105 degrees to approximately 135 degrees does not work as well as the range of approximately 60 degrees to approximately 105 degrees, and some sticking was experienced but released with wiggling of the screw. The total opening angle range from approximately 20 degrees to approximately 60 degrees allows the screw to slide smoothly to the hole body opening 204, but required a rather deep hole.

In one specific embodiment using a hole body diameter 204 of 0.136 inches, a hole opening diameter 202 of 0.408 inches, it was found that a total opening angle 134 of approximately 85 degrees to approximately 95 degrees worked best resulting in a hole depth 200 of around 0.136 inches.

Figure 4D:
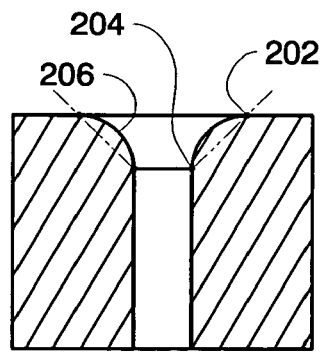
Figure 5:
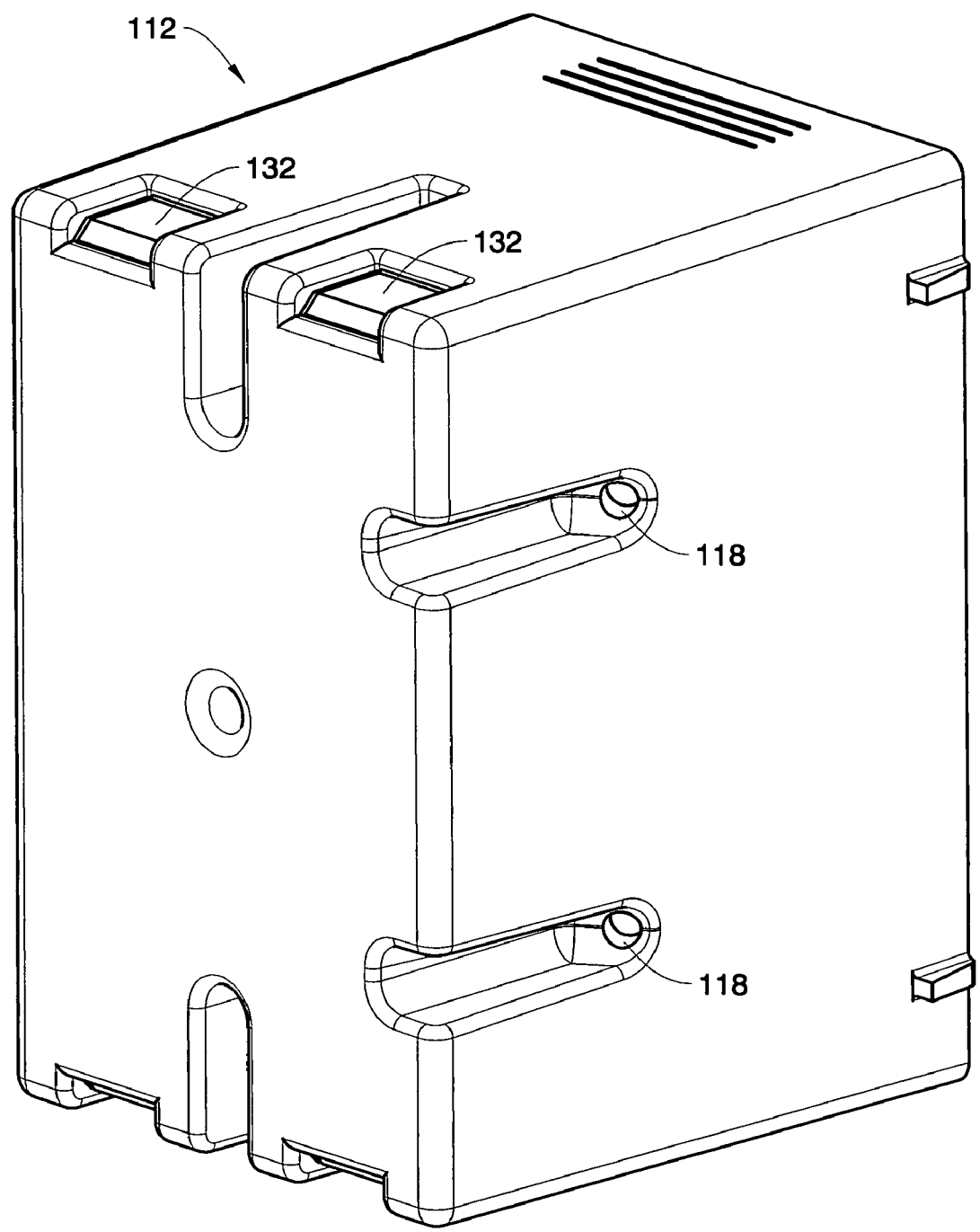
FIG. 5 is a rear perspective view of the outlet box of FIG. 2.

It will be understood by those of ordinary skill in the art that for mounting screw hole openings with conical sides 206 that do not have a constant slope, such as those shown in FIGS. 4C and 4D, because the surface friction upon the screw relative to the angle of the surface will vary along the conical side surface 206, in most cases the slope corresponding to the angle of the sides 206 should remain fairly close to the total opening angle 134.

Figure 6:
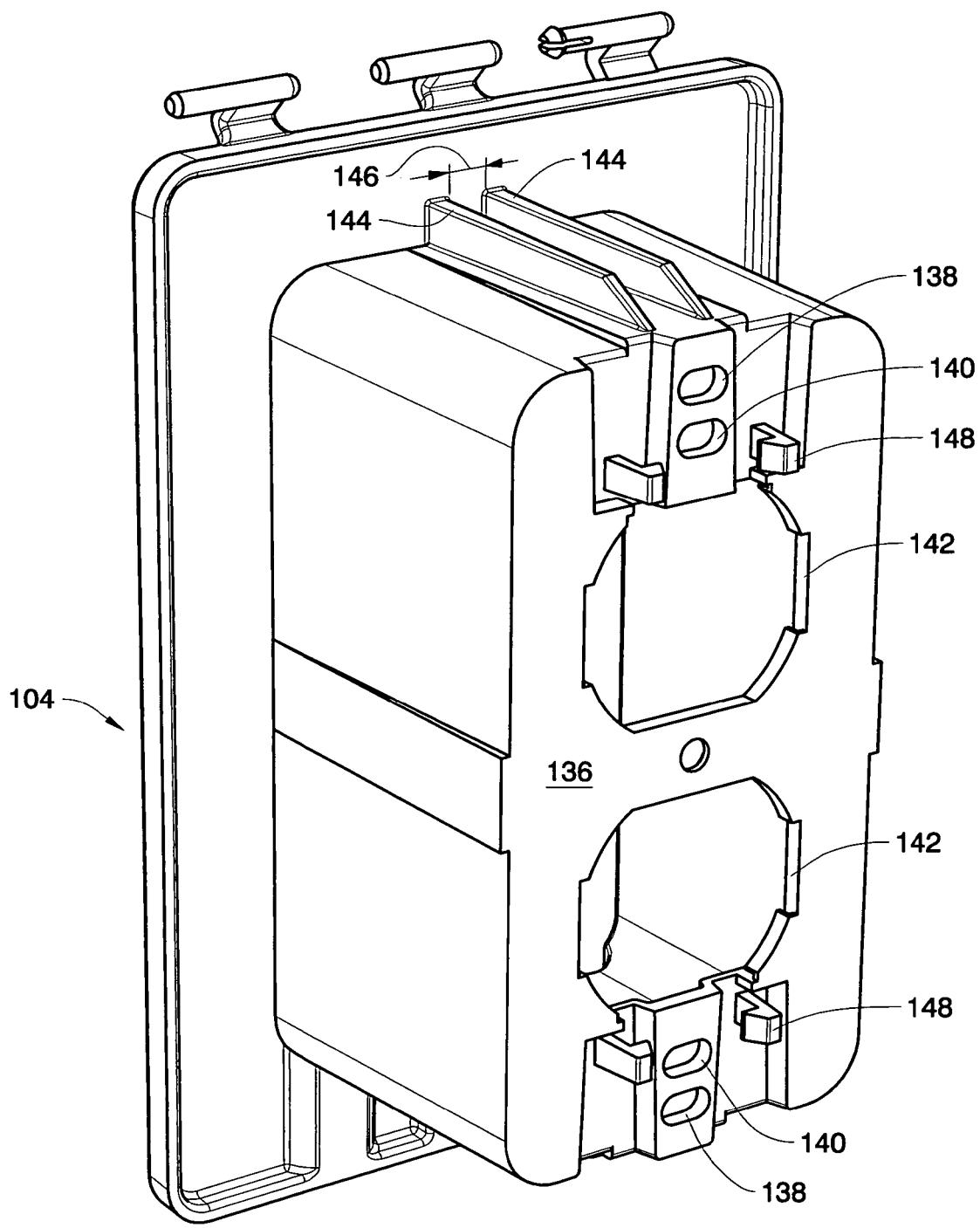
FIG. 6 is a rear perspective view of an insert for a recessed outlet configured according to an embodiment of the present invention.

FIG. 6 is a perspective view of the back of an insert 104 for a recessed outlet box configured according to a particular embodiment of the present invention. The insert 104 includes a back surface 136 having mounting screw openings 138 and 140, one or more openings 142 for an electrical device face. A pair of movement-restricting guides 144 corresponding to the guiding ridges 120 on the recessed outlet box 112 (FIG. 2) is also included. The movement-restricting guides 144 have a separation width 146 wide enough so that the guiding ridge 120 between the movement-restricting guides 144 can move to assist in aligning the insert upright on the wall, but small enough so that when adjusting, a portion of the relevant mounting screw opening 138 or 140 being used will expose at least a portion of the conical mounting screw opening 122 or 124 of the recessed outlet box 112 (FIG. 3).

Figure 7:
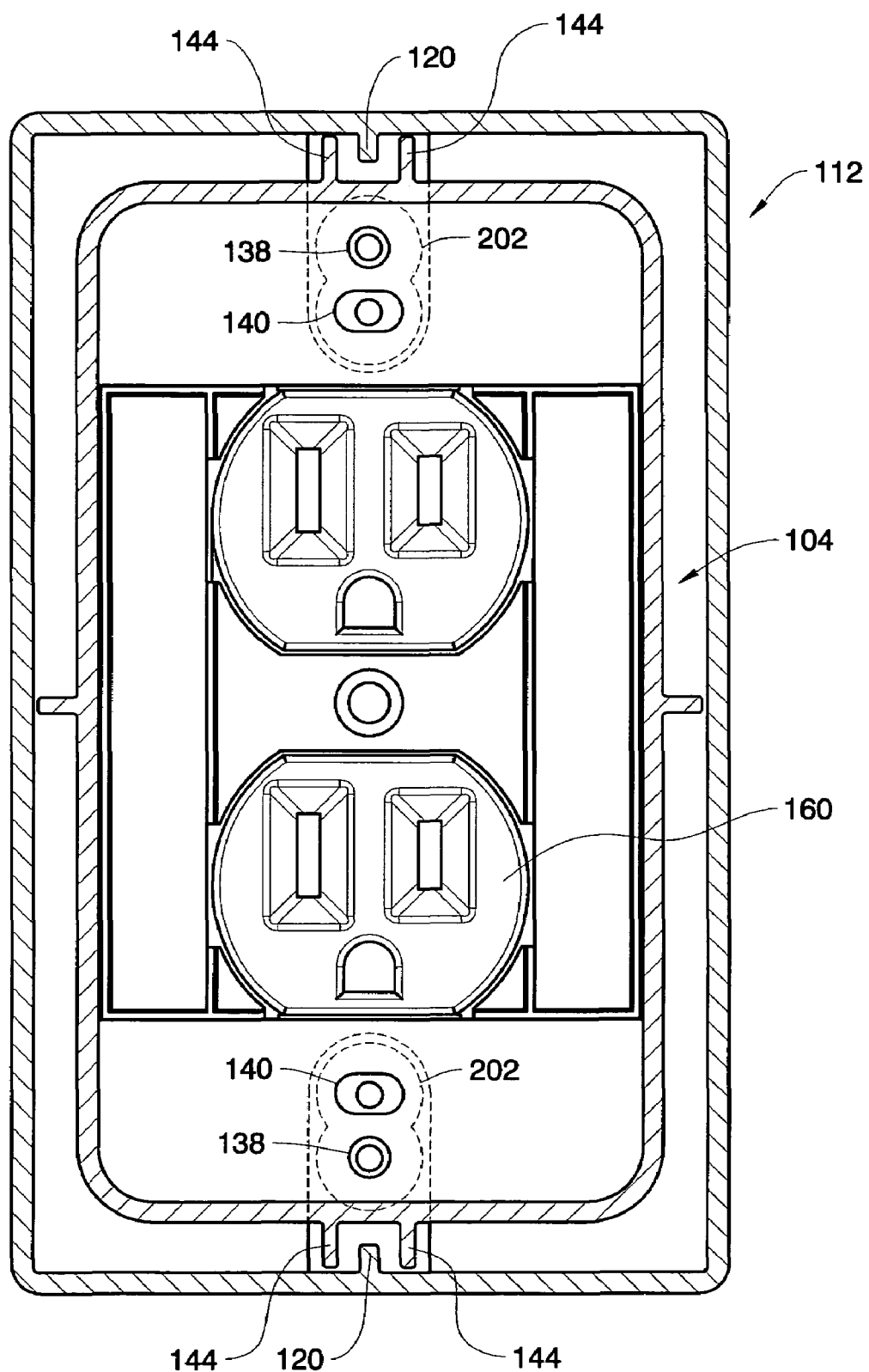
FIG. 7 is a cut-away front view of the insert of FIG. 6 inserted squarely into an outlet box.
Figure 8:
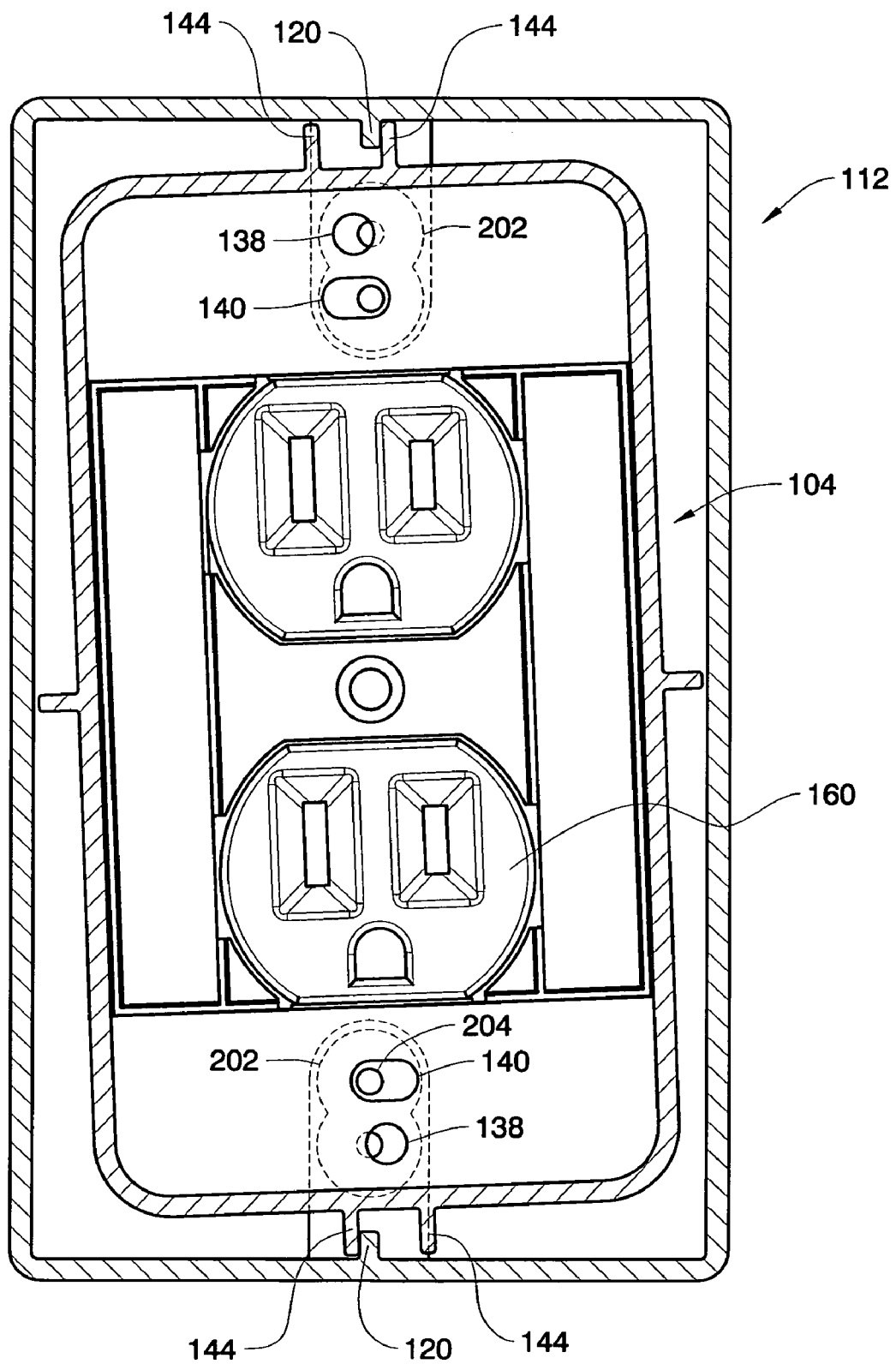
FIG. 8 is a cut-away front view of the insert of FIG. 7 inserted crooked into the outlet box.

As shown in FIGS. 7 and 8, the interaction between the movement-restricting guides 144 of the insert 104 and the guiding ridges 120 of the outlet box 112 ensure that the mounting screw 150 (FIGS. 9A–9C) can always be inserted somewhere within the range encompassed by the mounting screw hole opening diameter 202. FIG. 7 shows the guiding ridges 120 of the outlet box 112 centered between the movement-restricting guides 144 of the insert 104. While this is an ideal installation, situations for installations are not always ideal because outlet boxes are conventionally mounted on a wall frame that is often crooked.

Prior recessed outlets, such as that disclosed in U.S. Pat. No. 5,171,939 (Dec. 15, 1992), have included alignment supports on only the insert. It was found, however, that while the alignment supports included on the insert did support the insert within the outlet box and assist in alignment to an extent, the insert was still permitted to be manipulated beyond the boundaries of the outlet mounting screw, making installation difficult in many cases. Because the insert was permitted to move, and the mounting screw holes were very small, the installer was still required in many cases to peer into the insert while installing the screws to accurately place the mounting screws. The walls of the outlet box, being made of flexible plastic further exasperated the problem because the walls of the outlet box would freely flex and allow the insert to extend out of alignment as the insert was being twisted.

FIG. 8 shows the embodiment of FIG. 7 where the insert 104 has been twisted to the limits permitted by the interaction between the movement-restricting guides 144 and the guiding ridges 120. Note that in this embodiment, even if the mounting screw is inserted into the mounting screw opening 140 in a portion not directly aligned with the mounting screw hole body diameter 204, the conical opening of the mounting screw hole will direct the screw to the screw hole body. Similarly, if a mounting screw is placed in mounting screw opening 138, it will be directed by the conical sides of the mounting screw hole to the mounting screw hole body. In a conventional recessed outlet box with no conical openings to the mounting screw openings, the screw would be caught on the flat surface of the mounting screw opening and the installer would need to work at moving the screw around until it fell into the narrow hole. Conventionally, this involves actual viewing of the hole and screw tip to determine accurate placement.

Two particular aspects of the present invention, namely the corresponding alignment features 120 and 144 on the outlet box 112 and the insert 104 respectively and the conical mounting screw hole openings 122 and 124, whether used in combination or even used separately, may greatly increase the efficiency and accuracy with which an installer can perform an installation. Separately, each of these aspects simplify the installation process by making it easier to insert the mounting screws into the mounting screw hole openings quickly. Together, they ensure that the mounting screws will be directed toward the mounting screw hole even if the installer is not looking into the insert when the screw is being placed. Provided at least some portion of the mounting screw opening 138 and 140 are over a portion of the conical mounting screw opening within the mounting screw hole opening diameter 204, the screw can be placed in a position where it will be urged into the mounting screw hole body.

Attachment clips 148 are included on the back side of the insert 104 for the insert embodiment shown in FIG. 6 to allow components of the assembly 100 (FIG. 1) to be snapped into place prior to placing the insert 104 into the outlet box 112. Because the attachment portions of the outlet box 112 for a recessed outlet box are placed so far back in the outlet box 112, it is often difficult to hold all of the pieces in place when placing the insert 104 into the outlet box 112. For example, unless the outlet 110 is attached to the insert 104 prior to placing it into the outlet box 112, it is very difficult to keep the outlet 110 straight for placement. In the past, additional screws, different from the outlet box mounting screw, have been used to attach the outlet 110 to the insert prior to mounting the insert 104 in the outlet box 112. See, for example, U.S. Pat. No. 4,988,832 to Shotey (Jan. 29, 1991), the disclosure of which is hereby incorporated herein by reference. This process, however, requires additional components to be used with the assembly 100, increasing cost, complexity, and the likelihood that one of the small pieces will be lost prior to installation. Alternatively, the outlet 110 could be coupled to the attachment clips 148 to hold it in place while the insert 104 is being aligned with the outlet box 112. After the insert is in place, the box mounting screws may be used to couple the insert and outlet to the outlet box 112.

Figure 9A:
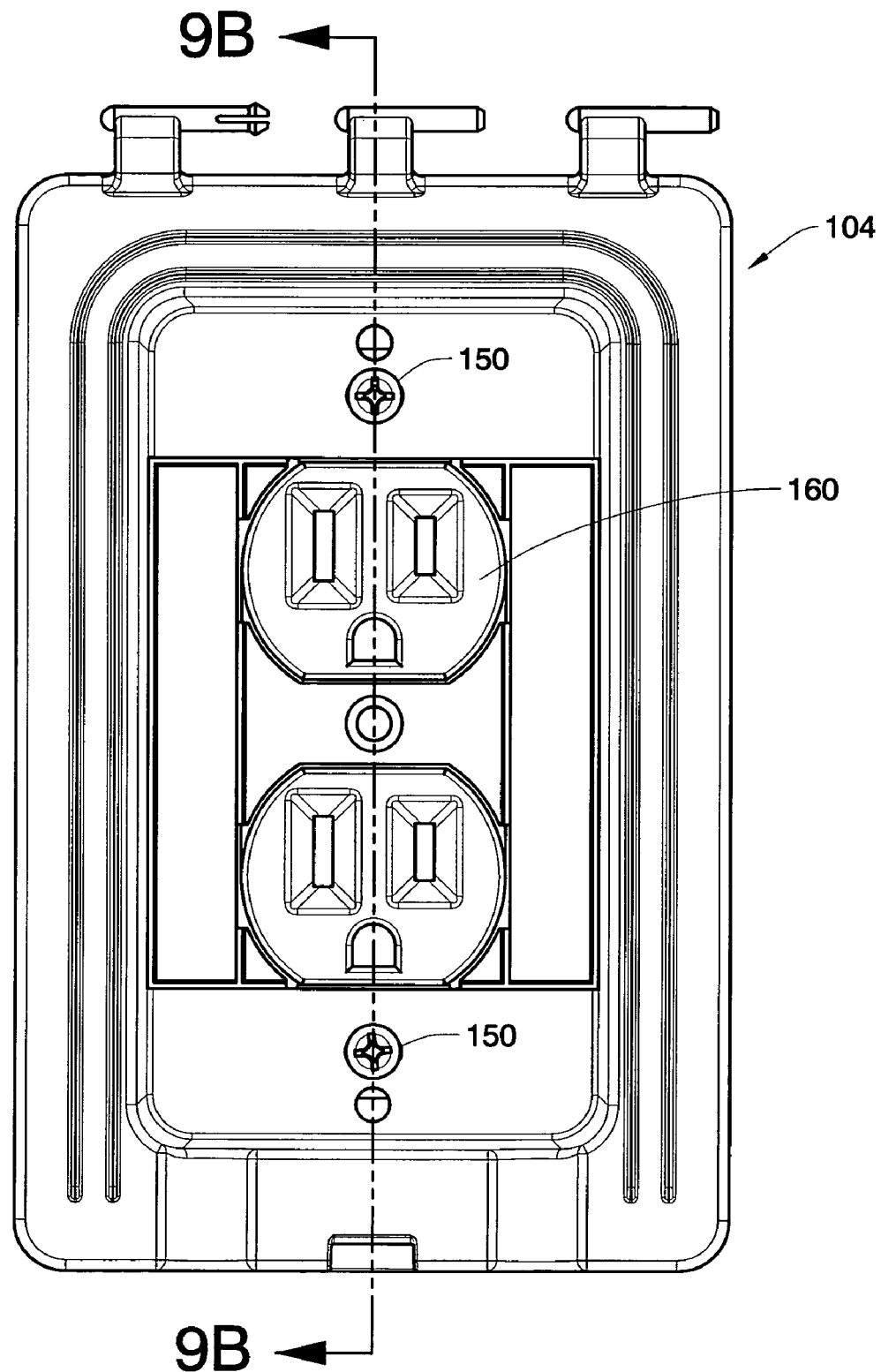
FIG. 9A is a front view of an insert configured according to a particular embodiment of the present invention with an electrical outlet mounted to the insert by screws and hexagonal nuts.
Figure 9B:
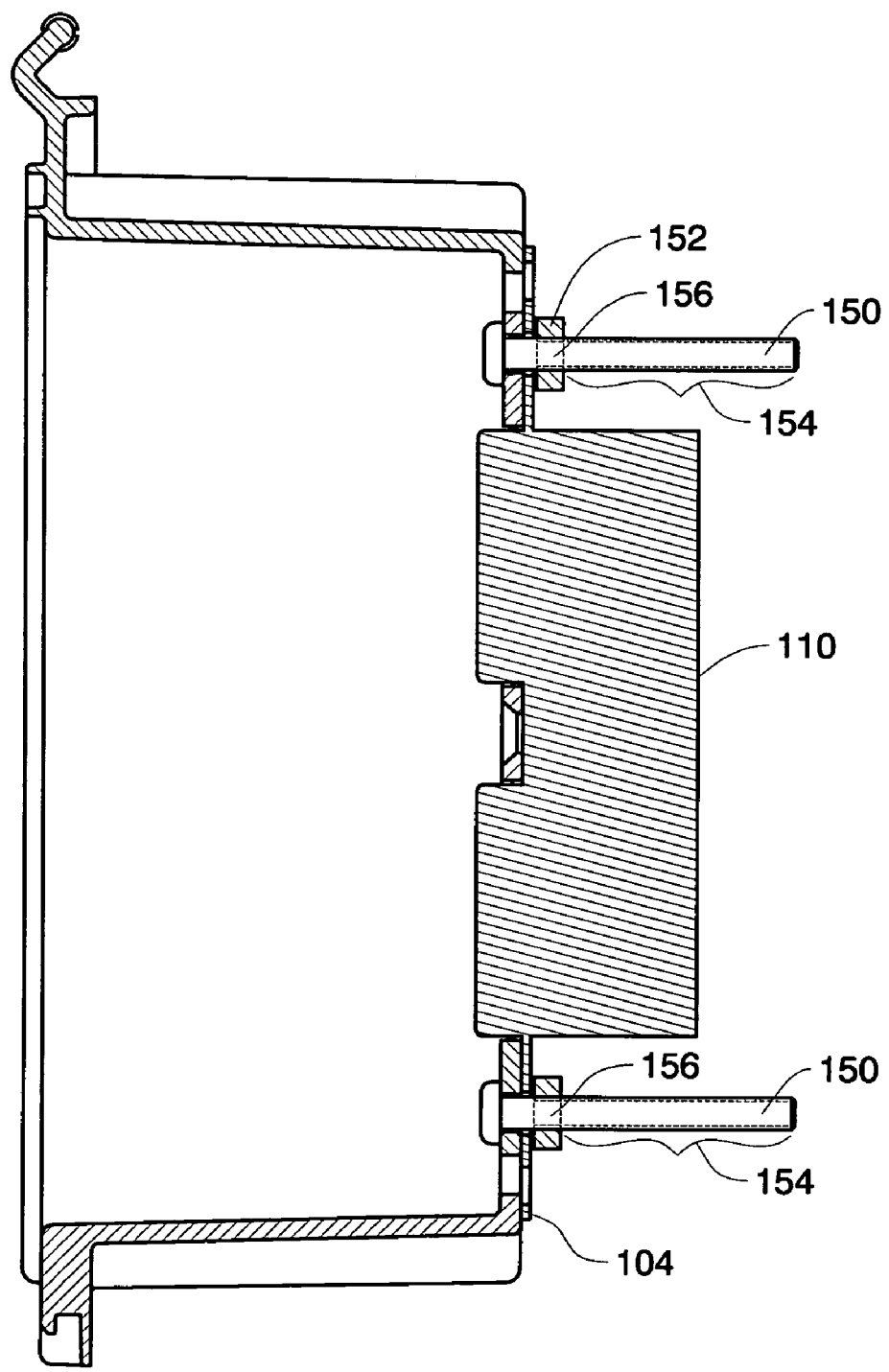
FIG. 9B is a sectional side view of the insert of FIG. 9A sectioned along line 9B—9B.
Figure 9C:
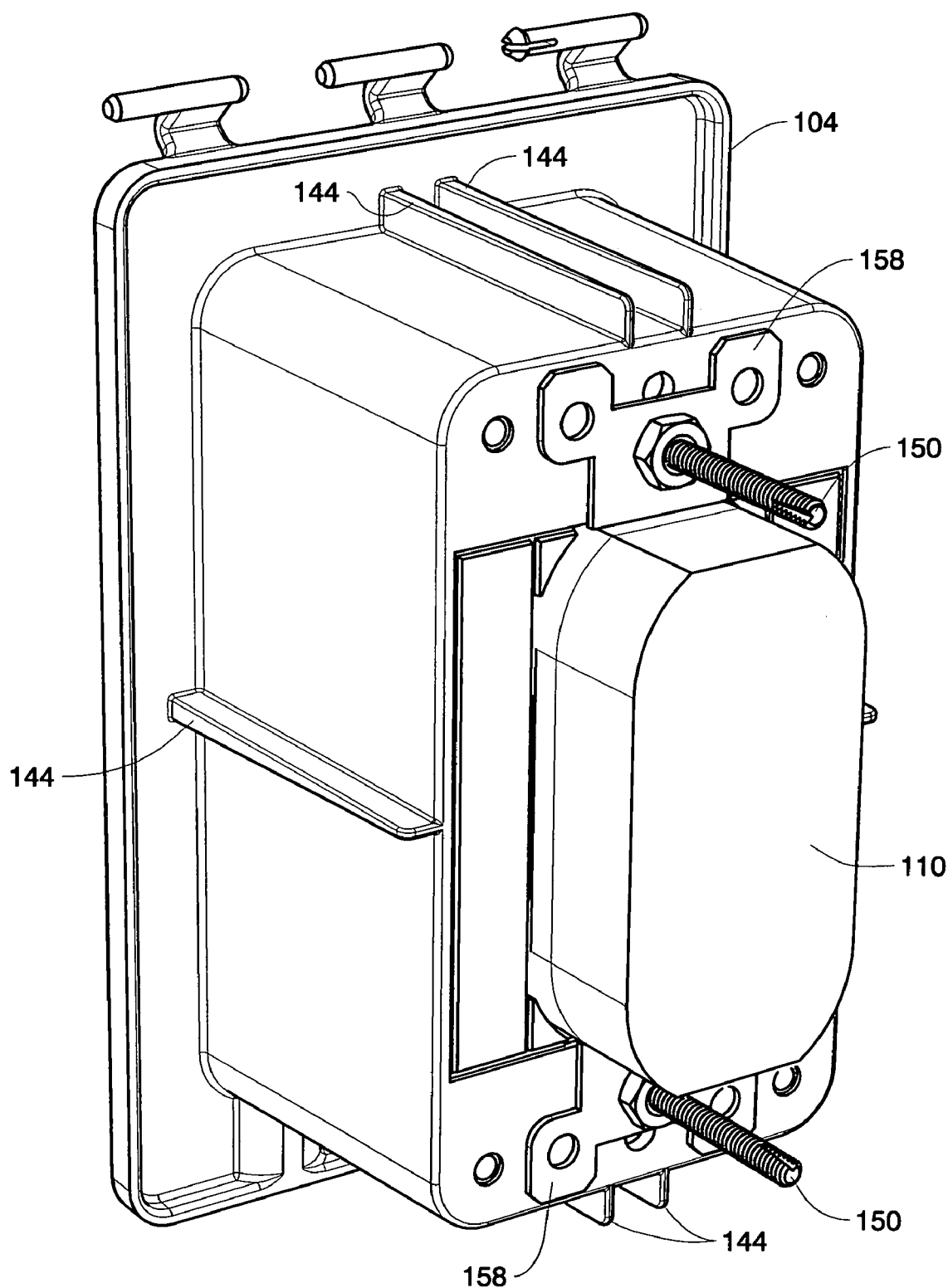
FIG. 9C is a rear perspective view of the insert of FIG. 9A.

FIGS. 9A–9C show another method of coupling the outlet 110 to the insert 104 by using mounting screws 150 that have a section 156 with no screw threads. When the outlet 110 is attached to the insert 104, the outlet face 160 is extended through the insert 104 from the back, aligning the mounting screw holes of the insert 104 and the outlet yoke 158. After the mounting screw holes are aligned, the mounting screws 150 are extended through the mounting screw holes from the front side of the insert 104 so that the mounting screw 150 heads are on the front side of the insert 104 and the screw shanks extend out of the back side. The screws 150 include a threaded portion 154, and an unthreaded portion 156. A threaded nut is coupled to the mounting screws 150 by threading it past the threaded portion 154 to the unthreaded portion 156. On a conventional outlet box mounting screw, the threads extend to the head of the screw. For conventional, non-mounting outlet screws that attach using a nut, the threads also extend nearly to the head of the screw so that the nut can grip the threads throughout the extent of the screw shank to hold it in place. For particular embodiments of the present invention where a nut 152 is used on a screw 150 with an unthreaded section 156, when the nut 152 reaches the unthreaded section 156, the screw 150 is able to continue turning in a tightening direction (conventionally clockwise) without further tightening the nut 152 on the screw 150.

By using a screw 150 with an unthreaded portion 156, the installer is able to attach the outlet 110 to the insert 104 with the screws 150 and nuts 152 prior to placing the insert 104 in the outlet box 112. After the outlet 110 is coupled to the insert 104, the insert 104 and attached screws 150 extending from the back side of the insert 104 are placed into the outlet box 112 so that the screws 150 mate with the mounting screw holes 122 or 124 (FIG. 2) of the outlet box 110. Because the screws 150 are still able to rotate in a tightening direction without the nuts 152 tightening on the screws 150, the screws 150 can still be threaded into the mounting screw holes 122 or 124 of the outlet box 110. When the side of the nut 152 contacts the surface of the mounting screw hole 122 or 124, the screw 150 will no longer be able to rotate in a tightening direction because the threaded portion 154 of the screw 150 is in mating relation with the threads of the mounting screw hole 122 or 124. The length of the unthreaded portion 156 of the mounting screw 150 should be about the distance from the back of the screw head to where the nut 152 ends on the screw when the nut is tightly installed against the outlet yoke 158. It is understood, however, that not all outlet yokes 158, however, are of the same thickness. As such, some leeway may be required to standardize the mounting screws for multiple thicknesses of outlet yoke thicknesses. Nevertheless, a tighter coupling is preferred for safety.

It is contemplated that in many cases, the installer may install the outlets 110 to the inserts 104 at some point prior to installation of the insert 104 into the outlet box 112. However, it is also contemplated that a recessed outlet box manufacturer may elect to pre-install the outlets 110 onto the inserts 104 to save time for the installers. Because the screws 150 of the embodiment shown in FIGS. 9A–9C are able to rotate despite being coupled to the insert and outlet, this is possible. Pre-installation of the outlets 110 to the inserts 104 not only saves time, it reduces the likelihood that the small pieces will be lost prior to installation. Particularly for recessed outlet boxes, where the components are installed so far back within the outlet box, pre-installation of the outlet 110 to the insert 104 is a significant help to and timesaver for installers.

Figure 9D:
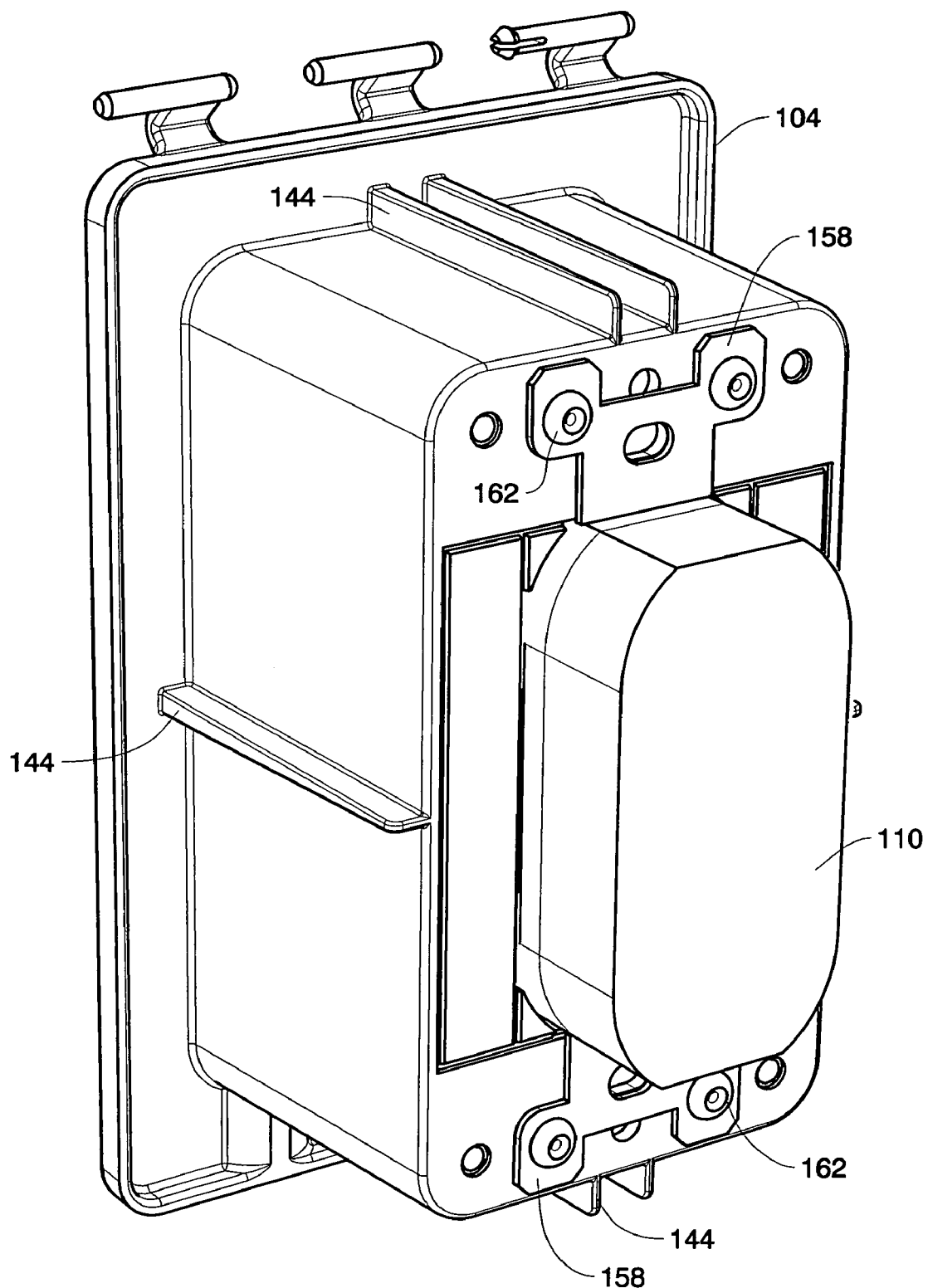
FIG. 9D is a rear perspective view of an insert configured according to another particular embodiment of the present invention with an electrical outlet mounted to the insert by heat stakes.

FIG. 9D illustrates another approach to pre-installing the outlet 110 to the insert 104. In this embodiment, the outlet 110 is heat staked 162 to the insert 104 through the outlet yoke 158. Heat staking of metal components to plastic is a process known in the art of plastics manufacture. The process involves melting a portion of plastic over the metal component to hold it in place. For the present embodiment, a manufacturer of recessed outlet assemblies pre-installs the outlet 110 to the insert 104 by applying a heat stake 162 to one or more places on each of the two yokes 158 of the outlet 110 after the outlet 110 is aligned with the back surface of the insert 104. When the installer wants to install the outlet 110 and insert 104 into an outlet box 112, the installer need only align the insert in the outlet box and insert the mounting screws.

Yet another embodiment of the present invention contemplated for pre-installing outlets 110 to an insert 104, or at least simplifying the attachment of the outlet 110 to the insert 104 for easy installation by the installer, is to form a slot in the back surface of the insert 104 sized and shaped to receive either the top or bottom yoke 158 of the outlet 110, and a clamp to secure the other yoke 158 of the clamp. The outlet 110 may be attached to the insert 104 by sliding a first yoke 158 into the slot on the back surface of the insert, aligning the outlet faces 160 with the openings in the insert 104, and clamping the second yoke 158 to the insert 104 with a moveable clamp. The clamp may be formed with, for example, a living hinge out of the same plastic or polypropylene material that the insert is formed of, or separately attached, for example as a clip, to the back surface of the insert.

Figure 10:
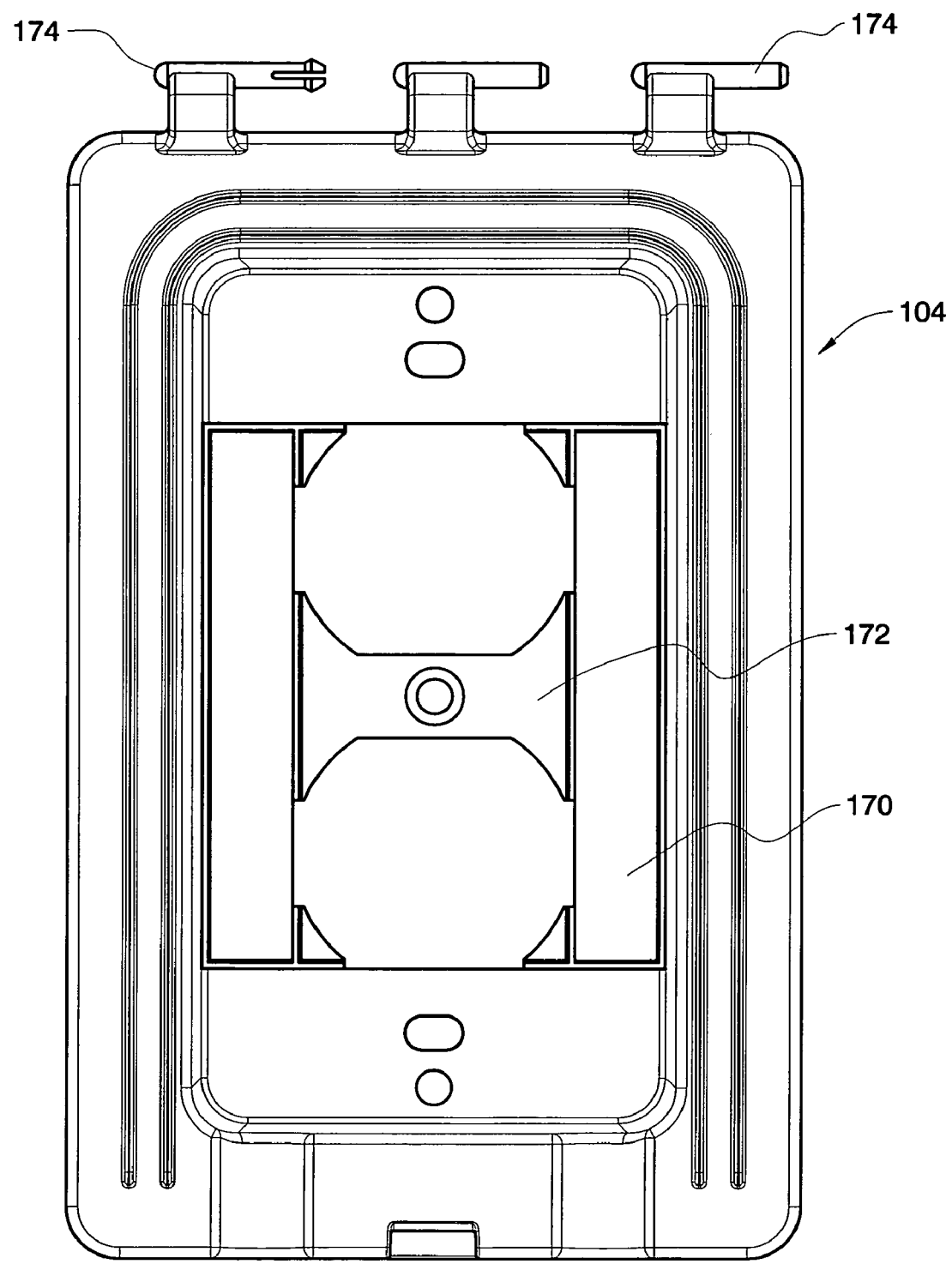
FIG. 10 is a front view of an insert configured according to an embodiment of the present invention having knock-out tabs in a rear wall of the insert.

FIG. 10 is a full view of the front of the insert 104, and includes the insert hinge members 174. While pin-style hinge members are shown here by example, any number and styles of hinge members, including biased hinge members to bias the cover 102 into a closed position against the insert 104 or outlet box 112, will also work adequately to hinge the cover 102 to the insert 104. Additionally, FIG. 10 illustrates that the back surface 175 of the insert includes a plurality of removable tabs 170 and 172 that can be removed from the insert 104 to adapt the insert 104 to a variety of different outlet styles, shapes and sizes. Although the specific embodiment shown in FIG. 10 is configured to receive a duplex outlet in its present configuration, it may be adapted to receive a GFCI or decorum outlet by removing the inner tabs 172, or leave a large rectangular opening by also removing the outer tabs 170. The tabs may be established by forming a groove in the material surrounding the tab to thin the back surface 175 of the insert 104 for easier removal. The groove may be on one or both sides of the back surface 175. U.S. Pat. No. 6,583,358 (Jun. 24, 2003) to Shotey et al., the relevant disclosure of which is hereby incorporated herein by reference, discloses formation of removable tabs of a number of different sizes, styles and shapes, on a base for an outlet coverplate.

Figure 11:
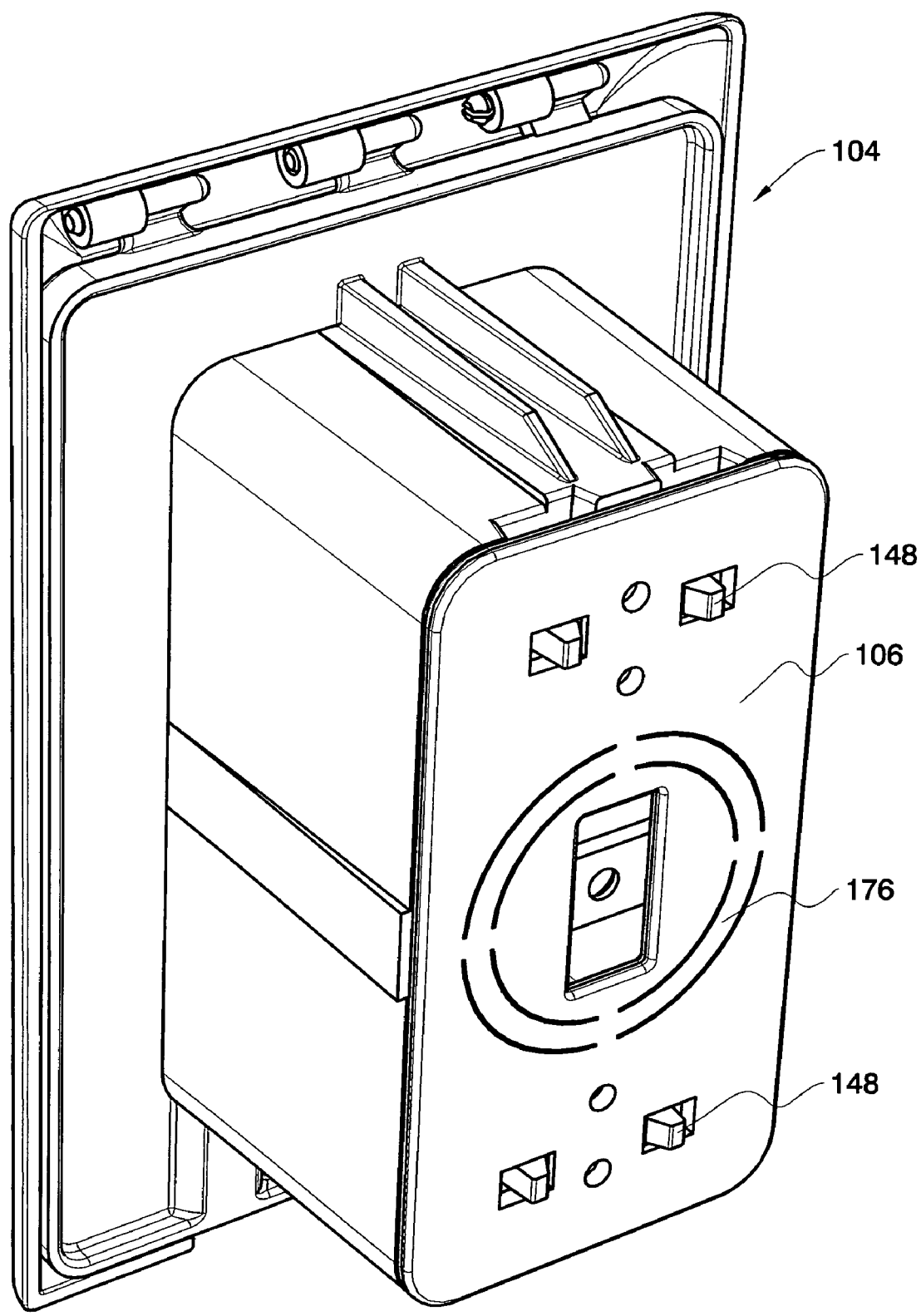
FIG. 11 is a rear perspective view of an insert for a recessed outlet with an adapter plate coupled thereto according to an embodiment of the present invention.

FIG. 11 shows another use for the attachment clips 148. An adapter plate 106 may be coupled to the attachment clips 148 to enable the insert 104 to be used for outlet configurations different from the original configuration for the insert 104. By removing some or all of the removable tabs 170 and 172 from the back surface 175 of the insert 104, and by attaching an adapter plate 106 onto the back surface of the insert 104, the insert may be adapted to any type of outlet or even other types of connectors, such as cable connectors, telephone connectors, computer connectors, and the like. U.S. Pat. No. 6,642,453 (Nov. 4, 2003) to Shotey et al., the relevant disclosure of which is hereby incorporated herein by reference, discloses formation of removable tabs of a number of different sizes, styles and shapes, in adapter plates for a base of an outlet coverplate.

Figure 12:
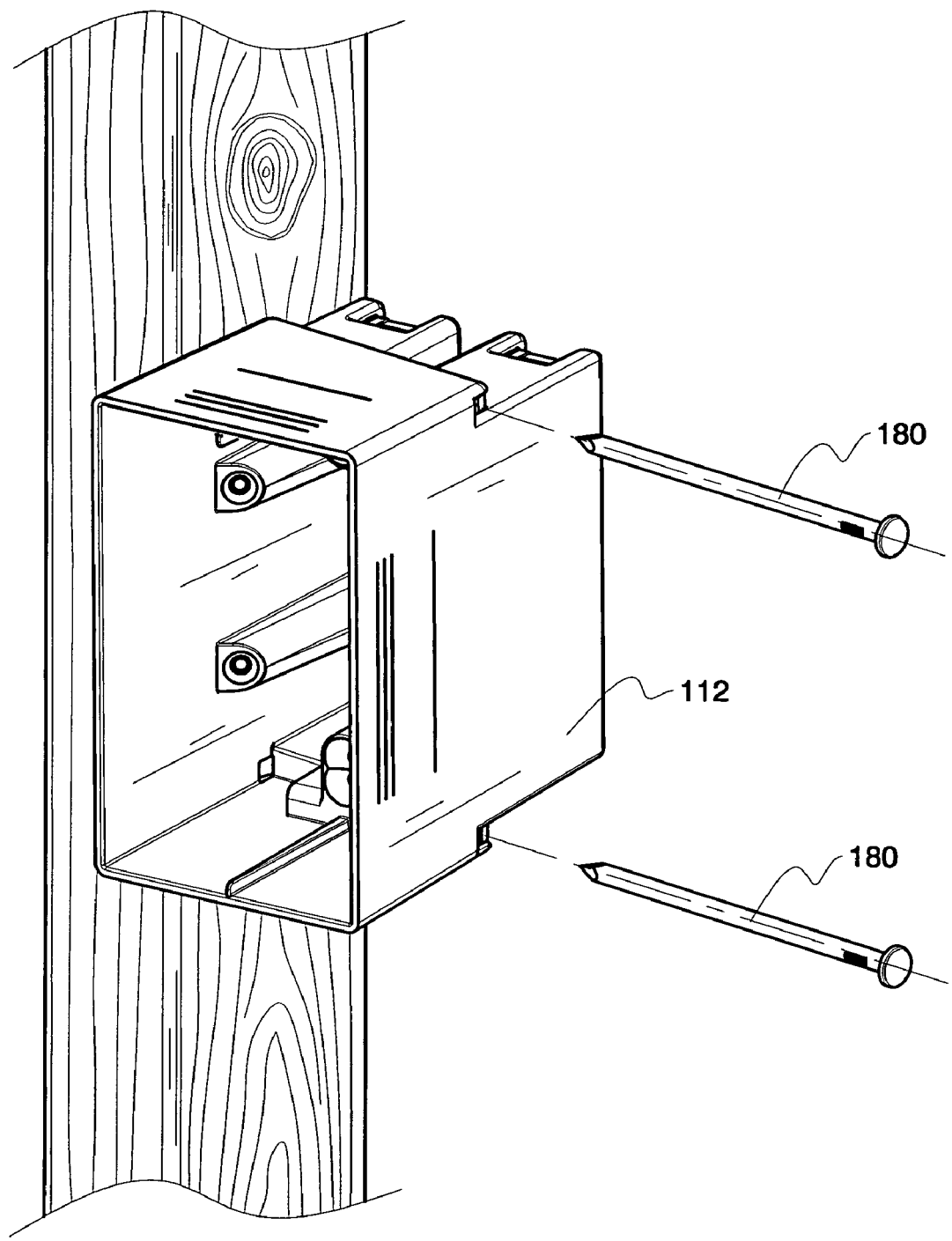
FIG. 12 is a perspective view of an embodiment of a recessed outlet box being mounted to a 2×4 stud.
Figure 13:
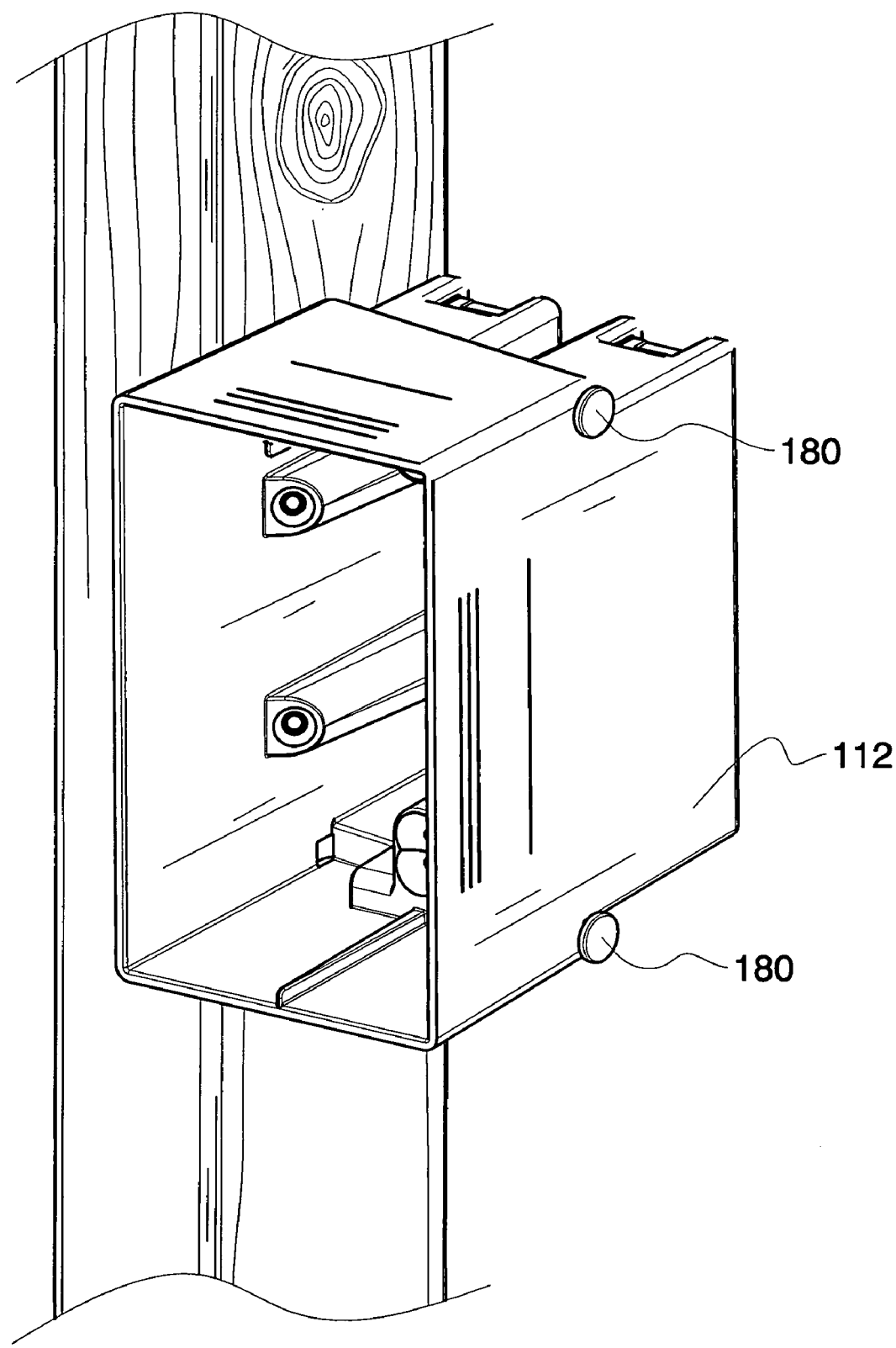
FIG. 13 is a perspective view of the recessed outlet box embodiment of FIG. 12 where the outlet box is mounted to the 2×4 stud by nails.

FIGS. 12 and 13, respectively, show perspective views of a recessed outlet box 112 being mounted to a 2×4 stud by nails. Alternatively, as explained previously with respect to FIG. 2, the outlet box 112 may be mounted using screws from the inside of the outlet box 112.

FIGS. 14 and 15, respectively, illustrate rear and front perspective views of a portion of a recessed outlet assembly 220 coupled to a wallboard 222. The outlet box 224 of the assembly 220 includes two rotatable clamps 226 that may be rotated by a mechanism 228 on the front side of the outlet box 224. The hinge members 230 for this embodiment of the recessed outlet assembly are formed on the lip of the front side of the outlet box 224. Rather than extending over the front of the outlet box 224 for this embodiment, the insert 232 fills the space within the perimeter of the outlet box 224 so that there is a tight fit between the edge of the insert 232 and the opening of the outlet box 224. It may even be configured to be seated on a ledge around the perimeter of the inside of the outlet box 224 to ensure a tight fit.

Because the installer is not limited by the wall framing done previously or whether the outlet box 224 is installed straight on the wall with this embodiment, there is no need to allow for adjustment of the insert to straighten the outlet on the wall. Rather, with this embodiment of an outlet box, the installer merely needs to cut the hole for the outlet box 224 into the wallboard 222 straight and the outlet will be installed straight. If any adjustment is needed, it can be done by adjusting the outlet box 224 within the opening in the wallboard 222. Through the use of rotatable clamps 226 on an outlet box 224 with a front lip, and an insert 232 that fits tightly within the outlet box 224, it is now possible to install a recessed outlet box assembly between the span of the framing materials after the wallboard 222 is installed on the frame. Once the insert 232 is placed within the outlet box 224, the outlet mounting screws 234 may be secured to the outlet box 224 to further secure the insert 232 and outlet to the box 224. It is also contemplated that the clamps 226 may be placed along the top and bottom of the outlet box 224 rather than, or in addition to, the clamps 226 arranged along the sides of the embodiment of FIGS. 14 and 15.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A recessed electrical outlet box and cover system mountable substantially flush with a mounting surface for receiving at least one plug having an electrical cord extending therefrom, the outlet box and cover system comprising:

an outlet box having side walls extending from a back wall, the walls defining a space therebetween, the outlet box comprising outlet mounting screw holes;

an insert having side walls extending from a back wall, the walls defining a space therebetween, the insert walls sized and shaped to insert at least partially into the outlet box, the insert having mounting screw apertures in the back wall; and a cover sized to cover the space defined by the insert, the cover configured to pivotally couple with the insert such that the cover can pivot to a closed position over the space between the insert walls;

wherein at least one guide ridge extends from an inside surface of at least one outlet box side wall and at least one movement restraining guide extends from an outside surface of at least one insert side wall, the guide ridge extending at a location corresponding to the movement restraining guide such that when the insert is placed into the outlet box, the interaction between the guide ridge and the movement restraining guide restricts rotational movement of the insert within the outlet box and aligns at least a portion of the mounting screw apertures of the insert with at least a portion of the mounting screw holes of the outlet box.

2. The system of claim 1, wherein the insert back wall comprises at least one electrical device aperture therethrough.

3. The system of claim 2, wherein the electrical device aperture comprises two electrical device apertures sized and shaped to receive socket faces of a duplex outlet.

4. The system of claim 2, wherein the insert back wall further comprises at least one removable tab which when removed converts the electrical device aperture from a first configuration corresponding to a first electrical device, to a second configuration different from the first configuration and corresponding to a second electrical device.

5. The system of claim 1, wherein the insert back wall comprises at least one clip on its outside surface, the clip configured to engage a yoke of an electrical outlet and hold the electrical outlet against the recess member.

6. The system of claim 5, wherein the at least one clip comprises at least two pair of prongs extending from the back surface, each pair of prongs having a space between the pair corresponding to a width of a portion of an electrical outlet such that when the electrical outlet is placed against the prongs, the prongs grasp the electrical outlet to hold the electrical outlet against the recess member.

7. The system of claim 5, the insert back wall further comprising a slot positioned on the recess member back wall in relation to the mounting screw apertures to receive a first yoke of an electrical device, wherein the at least one clip comprises a bracket, the bracket positioned on the recess member back wall in relation to the mounting screw apertures to clamp a second yoke of the electrical device.

8. The system of claim 1, wherein at least one of the outlet mounting screw holes comprising a hole opening having an opening diameter and a hole body having a body diameter, the opening diameter being larger than the body diameter, the hole opening sloping to the hole body to form a conical opening with a total opening angle between about 20 degrees to about 135 degrees.

9. The system of claim 8, wherein the total opening angle is between about 60 degrees to about 105 degrees.

10. The electrical device box of claim 1, wherein the total opening angle is between about 85 degrees to about 95 degrees.

11. The electrical device box of claim 1, wherein the hole opening diameter is approximately 1.5 times to approximately 3.5 times larger than the diameter of the hole body diameter.

12. The electrical device box of claim 1, wherein the hole opening diameter is approximately 3 times larger than the diameter of the hole body diameter.

13. The electrical device box of claim 1, wherein the hole opening has a depth of approximately 0.5 times to approximately 2 times the diameter of the hole body diameter.

14. The electrical device box of claim 1, wherein the hole opening has a depth approximately equal to the diameter of the hole body diameter.

15. An electrical device box for mounting an electrical device, the box comprising:
   a plurality of side walls and a back wall defining a space therebetween for receiving an electrical device;
   at least two mounting screw holes each attached to at least one wall of the box and positioned within the box to receive mounting screws of the electrical device;
   wherein at least one mounting screw hole includes a hole opening having an opening diameter and a hole body having a body diameter, the opening diameter being larger than the body diameter, the hole opening sloping to the hole body to form a conical opening with a total opening angle between about 20 degrees to about 135 degrees.

16. The electrical device box of claim 15, wherein the total opening angle is between about 60 degrees to about 105 degrees.

17. The electrical device box of claim 15, wherein the total opening angle is between about 85 degrees to about 95 degrees.

18. The electrical device box of claim 15, wherein the total opening angle is between about 105 degrees to about 135 degrees.

19. The electrical device box of claim 15, wherein the total opening angle is between about 20 degrees to about 60 degrees.

20. The electrical device box of claim 15, wherein the hole opening diameter is approximately 1.5 times to approximately 3.5 times larger than the diameter of the hole body diameter.

21. The electrical device box of claim 15, wherein the hole opening diameter is approximately 3 times larger than the diameter of the hole body diameter.

22. The electrical device box of claim 15, wherein the hole opening has a depth of approximately 0.5 times to approximately 2 times the diameter of the hole body diameter.

23. The electrical device box of claim 15, wherein the hole opening has a depth approximately equal to the diameter of the hole body diameter.

* * * * *